US008790176B2

(12) United States Patent

Hopf et al.

(10) Patent No.: US 8,790,176 B2

(45) Date of Patent: Jul. 29, 2014

(54) SYSTEM AND METHOD FOR REAL TIME INTERACTIVE ENTERTAINMENT

(75) Inventors: Patrick Hopf, Rancho Santa Fe, CA (US); David Ortiz, Newcastle, WA (US)

(73) Assignee: BVP Fund 1 March 2014, LP, Incline Village, NV (US)

( * ) Notice: Subject to any disclaimer, the term of this patent is extended or adjusted under 35 U.S.C. 154(b) by 0 days.

(21) Appl. No.: 13/336,987

(22) Filed: Dec. 23, 2011

(65) Prior Publication Data

US 2012/0191230 A1 Jul. 26, 2012

Related U.S. Application Data

(60) Provisional application No. 61/427,095, filed on Dec. 23, 2010.

(51) Int. Cl.
*A63F 13/00* (2014.01)

(52) U.S. Cl.
USPC .............................................. 463/25; 463/42

(58) Field of Classification Search
CPC . G07F 17/32; G07F 17/3288; G07F 17/3293; A63F 1/00; A63F 3/00157
USPC ................................................ 463/6, 25, 42
See application file for complete search history.

(56) References Cited

U.S. PATENT DOCUMENTS

| | | | | |
|---|---|---|---|---|
| 8,070,595 | B2 * | 12/2011 | Alderucci et al. | 463/25 |
| 8,092,301 | B2 * | 1/2012 | Alderucci et al. | 463/25 |
| 2006/0287094 | A1 * | 12/2006 | Mahaffey et al. | 463/42 |
| 2007/0197281 | A1 * | 8/2007 | Stronach | 463/28 |
| 2008/0113816 | A1 * | 5/2008 | Mahaffey et al. | 463/42 |
| 2008/0248846 | A1 * | 10/2008 | Stronach et al. | 463/6 |
| 2010/0041453 | A1 * | 2/2010 | Grimm, Jr. | 463/6 |

* cited by examiner

*Primary Examiner* — Masud Ahmed

(74) *Attorney, Agent, or Firm* — DLA Piper US LLP

(57) ABSTRACT

The system provides a method and apparatus for creating additional interest and participation for attendees at, or viewers of, live events and for fans and audience members observing or following along on television or the internet. The system provides a “game within a game” for an event by allowing participating patrons to predict event outcomes before or during the event, even on a short term real-time basis. The participant is rewarded for correct guesses and can even be given recognition at the event on a display (e.g. scoreboard) or jumbo screen. The participant can also earn points for using the system, even when guessing wrong. Participation and attendance are rewarded and the user can redeem points at the venue, further encouraging attendance.

10 Claims, 9 Drawing Sheets

ITEM SELECTION - STEP 2

SYSTEM AND METHOD FOR REAL TIME INTERACTIVE ENTERTAINMENT

This patent application claims priority to U.S. Provisional Patent Application 61/427,095 filed on Dec. 23, 2010 which is incorporated by reference herein in its entirety.

BACKGROUND OF THE SYSTEM

The present system relates to the field of interactive fan and audience participation at live and broadcast or digitally streamed events.

Studies have shown that each new generation of people is more impatient and less likely to devote their attention to a single task or presentation, even when the task at hand is entertainment. The rise of available resources of stimulation and entertainment, including communication tools such as computers, smart-phones, cell phone, table devices, and the ubiquity of internet access on handheld devices, has led to a population that is not only used to accessing multiple forms of stimulation at the same time, but is impatient with long form entertainment. Today most people are more interested in short quick bites of stimulation than in investing long periods of time to one particular thing. Even when a person is willing to devote an extended period of time to an event, the person is willing to periodically be interrupted by other stimulation, including phone calls. As a result, when people attend or watch live events, their attention can wander, possibly making them disinclined to attend at all.

Another drag on attendance at live events is the rise of high definition large screen televisions and the sophisticated presentation of live events on television. Such systems provide much better views (and replays) for viewers than if they were at the event. If a fan cannot get tickets in the first few rows, the television experience will generally be superior to live attendance.

Promoters of live events and venue owners have tried to compensate for these factors by including large screen displays, jumbotrons, and other features at live events to provide an equivalent experience to home viewing with the distinct advantage of being at the event. This has worked to a point, but has not been sufficient to increase demand for live attendance as much as desired.

One area where the disinclination to attend live events is felt keenly is in sports. While there are some teams and locations whose attendance has remained strong, there are many others where attendance has fallen. Another factor affecting some sports, particularly baseball, is the failure to attract a young demographic to the event. Such a failure to attract younger fans is of concern for the future health and viability of live presentations.

BRIEF SUMMARY OF THE SYSTEM

The system provides a method and apparatus for creating additional interest and participation for attendees at, or viewers of, live events and for fans and audience members observing on television or the internet. In addition, the user could follow a game tracker without being able to see the actual live or broadcast event. The system provides a "game within a game" for an event by allowing participating patrons to predict event outcomes before or during the event, even on a short term real-time basis. The participant is rewarded for correct guesses and can even be given recognition at the event on a display (e.g. scoreboard) or jumbo screen. The participant can also earn points for using the system, even when guessing wrong. Participation and attendance are rewarded and the user can redeem points at the venue, further encouraging attendance. The system in effect allows attendees to do more than merely watch the event, they become part of the event.

The system can use the probabilities of outcomes occurring in certain situations to set odds or rewards for a particularly good guess or prediction. For example, if the outcome to be predicted has a high likelihood of occurring, then a small number of points can be awarded for going with the odds, but a much larger number of points can be awarded for going against the odds. In one embodiment, the points system can use a dynamically calculated pari-mutuel type calculation where the odds are determined by the participants themselves. The more people that predict outcome A versus outcome B, the lower the point award if outcome A happens and the higher the award if outcome B happens. This is an example, but the system may also have general point values associated with predictions as multipliers to the amount of Points the player is willing to put up to back their prediction. Points are used for backing the player's predictions. Points will be given at the onset of an event and can be purchased as micro transactions and can also be won as a reward for successful performance in various Games.

DETAILED DESCRIPTION OF THE SYSTEM

Figure 1:
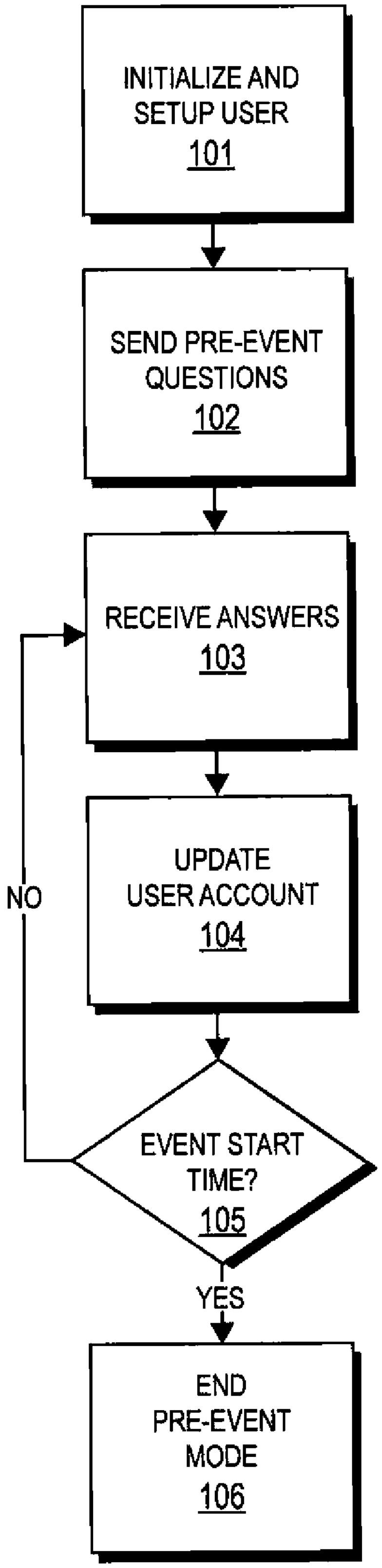
FIG. 1 is a flow diagram illustrating one embodiment of the operation of the system in a pre-event mode.

The system in one embodiment will consist of a networked group of active participants who predict outcomes of what will happen at various moments of a live event, such as a sporting event. The system will allow participants to earn points and prizes depending upon how many correct answers they generate relative to the probabilities of those outcomes occurring. The system will award points and prizes to the best prognosticators who attend a specific event in person, as well as those who are participating online. In addition, there may be a season long contest in which those who accumulate the most points win prizes at year-end. The system will track each participant's point totals by sport. In addition, groups of participants can form sub-groups and compete against each other or compete against other customized teams of players. The system contemplates a "league" format where users will compete against each other over some time frame (e.g. season) in head to head and/or cumulative competitions.

The system also contemplates demographic segmentation such as by age, gender, metro area, military branch, absolute points, as well as percentage points earned. Prizes and promotions can be provided from Sponsors and may include items such as airfare, hotel stays, golf clubs, football jerseys, tickets to sporting events, TV's, IPADs, laptops, cell phones, racing bikes, tee times, and dinners at restaurants, and other prizes and rewards. In one embodiment, the rewards may be provided by sponsors and may be dependent on the rules and laws in the jurisdiction of the user of the system. In addition, the team owners may have "winner's seats" that can be used at a future game by the participant and/or team that scores the most points during a particular game or even on a special "win the seat" question or game.

Year-long prizes will include international trips, new cars, skiing trips, the ability to attend games/training camp and meet athletes, and tickets to events like the Super Bowl, World Series, Masters Golf Tournament and the NBA Finals.

The events can be any at which unknown or non-predetermined outcomes are possible. In one embodiment, live sports provide a plurality of individual moments that generate a variety of unknown and/or non-predetermined outcomes. The sports involved may include baseball, football, basketball, golf, hockey, soccer, cricket, rugby, track and field and any sport where a plurality of unknown outcomes will occur. Other events which include such unknown moments include reality TV and other entertainment events. The system is not limited to these particular sports or events. Other sports, as well as any event for which it is possible to allow users to predict or guess outcomes, may be used without departing from the scope and spirit of the system.

In one embodiment, the system has several modes of operation. One mode is a pre-event mode where participants can predict certain outcomes related to the overall event and possible specific outcomes or accomplishments that may occur during the event. Another mode is an event mode that takes place during the event itself. The event mode itself may have a standard mode and an express mode, depending on the nature of the event and the desire of the participant.

The user interacts with the system through a variety of ways, including via smart-phone, personal digital assistant, tablet computer, laptop, interactive television, computer system, or any other method of communicating and receiving information from the system.

Pre-Event Mode

Prior to an event actually occurring, there are many things that may happen based on statistics and historical data. With respect to a sporting event, perhaps the simplest example is to predict the winner and loser of the event. There are other outcomes that may be associated with the events for which meaningful predictions may be made in the pre-event time frame.

FIG. 1 is a flow diagram illustrating the operation of the system during an event. At step 101 the system is initialized and identifies the user (or users) that will be participating. This may be done in a number of ways. For example, the system may search its database for members that are subscribed to the particular sport, team, or event that is being presented. The system may send a request to each subscribed member for the event a query as to whether they are participating in the event. Alternatively, the user may log-in to the system and indicate participation in the event.

At step 102 the system sends out pre-event questions concerning certain outcomes of the event. These questions may be related to outcomes about the overall event, such as a predicted winner, a predicted number of points scored, and the like The following is an example of possible pre-event questions that may be presented to the user. The following example contemplates a baseball game, but has equal application to any other sport or type of event.

Consider that the New York Yankees are playing the Minnesota Twins at Yankee Stadium. Before the game starts, the system will ask participants to answer a number of questions on their smart phones IPTV's PC, IPads, Android tablets, or other hand held or computer devices. The pre-game questions may include some of the following possibilities.

According to the odds, there is a 55% probability the Yankees win the game. Who will win the game, Yankees or Twins? (If you guess Yankees, and they win, you get 45 points (1-55)) (If you guess Twins and they win, you get 55 points (1-0.45). Wrong answer—0 points.)

According to the odds, the average number of runs scored in a game between the Yankees and the Twins is 8.7. Will there be more than 8.7 runs scored or less? (A correct answer is worth 20 points; an incorrect answer is worth 0 points.)

C. C. Sabathia is pitching for the Yankees. On average, he pitches 7⅓ innings in his 25 starts. Will he pitch longer than this, or will he be pulled before he reaches 7⅓ innings? (A correct answer is worth 15 point; incorrect 0)

Joe Mauer is batting 0.333, so he gets a hit once in every 3 at bats. Tonight, how many hits will he get? (An answer of 0 that is correct will get 15 points; an answer of 1 that is correct will get 5 points; an answer of 2 that is correct will get 10 points; an answer of 3 that is correct will get 25 points; and an answer of 4 or more that is correct will get 50 points).

Between the Yankees and the Twins, they steal an average of 1.5 bases per game. Tonight, will there be 1 or less stolen bases, or 2 or more stolen bases? (correct answer is worth 10 points)

Which of these highly unusual events will take place tonight? (deductions if one guesses one or more of these, but they do not occur)

A shutout will occur (10 points if correct)

At least one player will get 4 or more hits (10 points)

A no hitter will be pitched (50 points)

A batter will hit for the cycle (50 points)

A batter will hit 3 or more homeruns (50 points)

In addition to the points that the user may receive for correct answers, the system may require that the user risk previously obtained or accumulated points in order to participate. This feeling of risk can add to the enjoyment of the event. In some cases, a user may risk a fixed number of points and be allowed to answer all pre-event questions. In other circumstances, the user will need to risk or pay points for each pre-event question of interest. It should be noted that the user is not required to answer all pre-event questions, only those of interest to the user. In fact, the user may opt out of the questions entirely.

At step 103 the system receives the answers to those pre-event questions of interest to the user and updates the user account at step 104. This updating of the account may include debiting the number of points required for participation.

The system defines a cutoff time for users to respond to the questions based on the expected start time of the event. At step 105 the system determines if the pre-event deadline has been reached. This may be the actual start time of the event or some cut-off time just prior to the start time. If the cut-off time has not been reached, the system returns to step 103 to see if the user submits more answers or changes any prior answers.

If the cut-off time has been reached, the system ends the pre-event mode at step 106 and updates the user account as necessary.

The system contemplates an interface on the user device that presents the questions to the user in order and/or can be viewed as part of a list. The user can cycle through the questions by answering, OKing a payment of points or amount of risk, or passing. If the questions are presented as a list, the user may select any of the questions from the list by touching it (such as on a touch screen device) or by using an on screen cursor or highlighter to click on the desired question. In the case of a list, when the user selects a question, the user is presented with a new screen with more data. The user can then answer, pay, risk or wager, or pass the question.

In one embodiment, the list has some indication of questions that have been answered, either by some color or highlight change from unanswered questions, or by removing them from the list of questions. In one embodiment, the user may return to questions already answered to change answers, as long as it occurs prior to the pre-event cutoff time.

Figure 2:
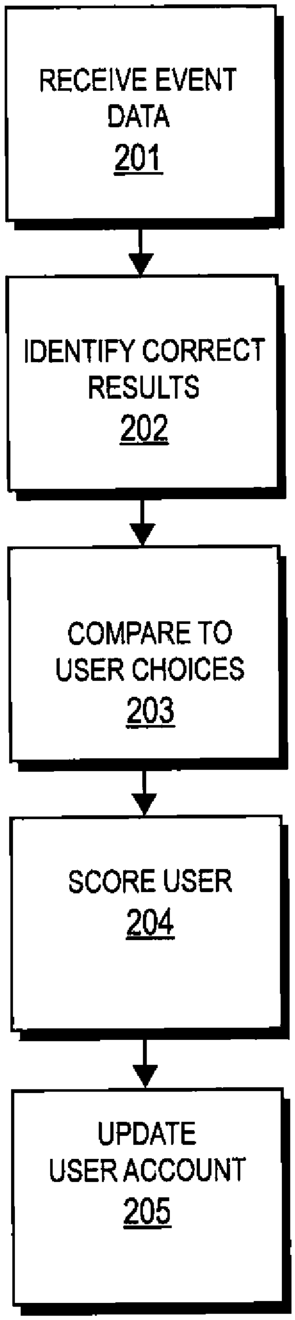
FIG. 2 is a flow diagram illustrating operation of the system in event mode.

FIG. 2 illustrates the operation of scoring and accounting of the user account in the pre-event mode. At step 201 the system receives updated data from a completed event. This may be via interne feeds, manual update, or some other means. At step 202 the system compares the event data to the pre-event questions to determine the correct results to the questions.

At step 203 the system compares the results to the choices made by the user. At step 204 the system scores the user based on the event results and the user choices. At step 205 the system updates the user account. The update of the account will consist of adding points for correct guesses, removing points for incorrect guesses, and debiting points risked or used to participate in the pre-event questions.

Figure 3:
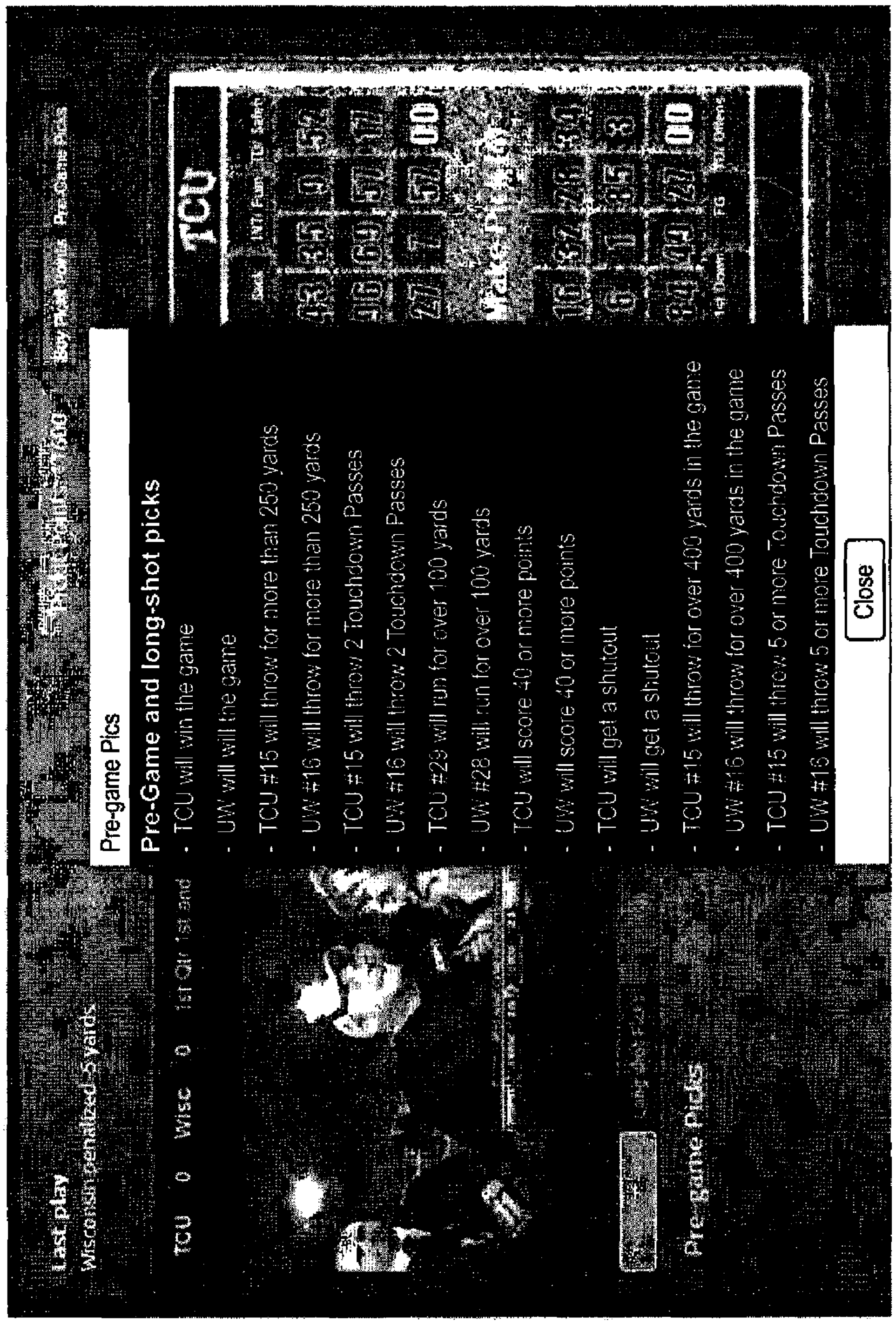
FIG. 3 illustrates possible pre-event questions in an embodiment of an interface of the system.

FIG. 3 is an example of one type of interface for pre-event questions. In the embodiment shown, the questions are presented in a list that allows the user to select a question and make a guess or prediction.

Event Mode

Once the event has begun, the system is in event mode. During event mode, the system presents the user with questions based on situations that are created during the event. In one embodiment, the system has one or more questions or question templates that are appropriate for different situations during the event. For example, if the event is a baseball game, there are a number of situations that can be expected to possibly occur during the game. For example, there are three bases and three outs per inning. The system can prepare template questions for each combination of number of baserunners (0, 1, 2, or 3) and number of outs (0, 1, or 2). Historical data has shown certain outcomes that can happen for each of these combinations (e.g. the likelihood of a certain number of runs being scored in an inning when such a situation presents itself).

Similarly, in a football game there are certain bounded situations and metrics for which the likelihood of a particular outcome can be determined statistically, either based on historical data and/or trends from the game itself. For example, in football there are four downs to achieve ten yards, and there are a number of situations of particular down and yardage to go that can provide the template for questions for the user.

Similarly, all sports have certain situations that lend themselves to outcome analysis and for which predictive questions can be presented.

In addition to such generic types of situations, there are more specific situations that can be the subject of questions. For example, there is typically a wealth of statistical data associated with particular players in an event. When such a player is participating, questions can be generated about the likelihood of the player achieving a particular outcome at the moment, and a question can be generated and presented to the user.

Figure 4A:
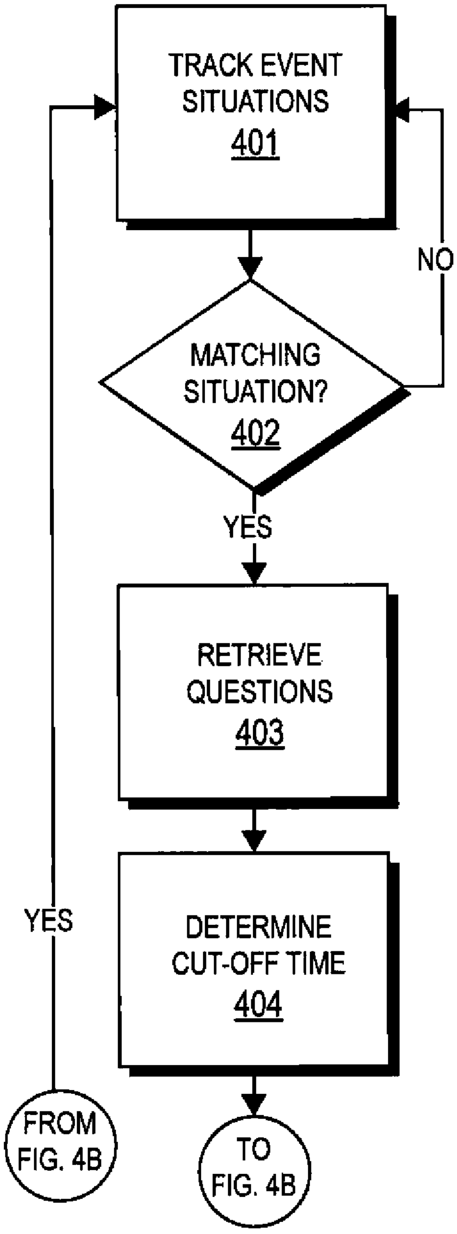
FIG. 4 is a flow diagram illustrating question generation during event mode.
Figure 4B:
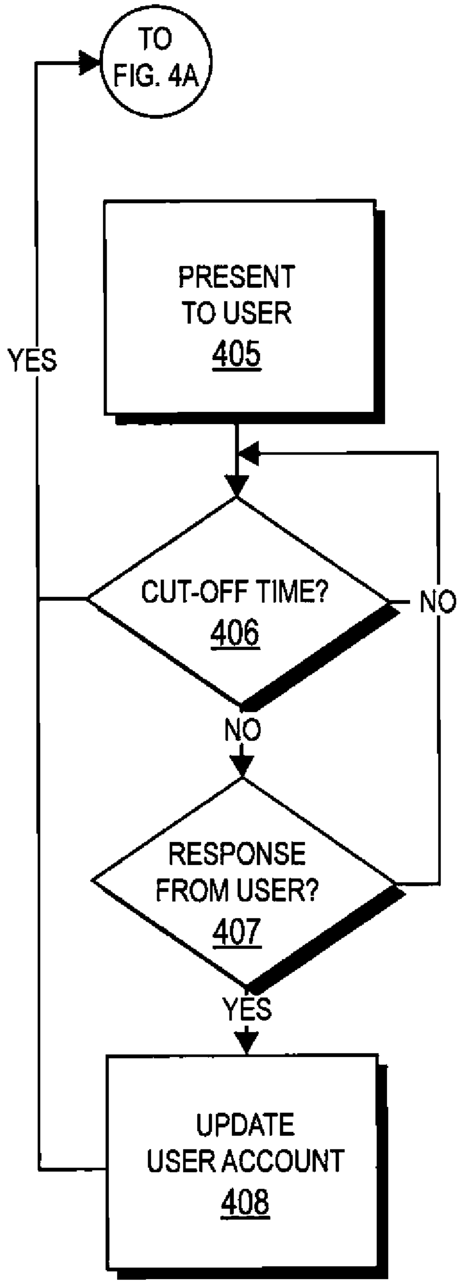

FIG. 4 is a flow diagram illustrating the operation of an embodiment of the system in event mode. At step 401, the system tracks situations that arise during the event. As noted above, the situations can involve generic metrics about the event itself, and/or it may include a situation involving one or more specific players or performers about whom questions can be generated.

At step 402 the system checks to see if the situation matches a list of stored situations for which questions have been generated. If not, the system returns to step 401 to track the event.

If the answer is yes at decision block 402, the system proceeds to step 403 and retrieves one or more questions associated with the situation from question storage. At step 404 the system determines the cutoff time for the user to provide a response to the question. This can be a fixed time period, a time period based on the particular situation, or it can be a manually enforced time period determined by a human viewer of the event who determines when the situation changes from prospective to determinative.

At step 405 the system presents the question or questions to the user. At decision block 406 it is determined if the cut-off time has occurred. If so, the system returns to step 401 to monitor the event. If not, the system proceeds to decision block 407 to determine if the user has responded with an answer or selection.

If the user has not yet responded, the system returns to step 406 to determine if the cut-off time has passed. If the user responds to the question, the system updates the user account, at step 408 and returns to tracking the event at step 401.

Figure 5:
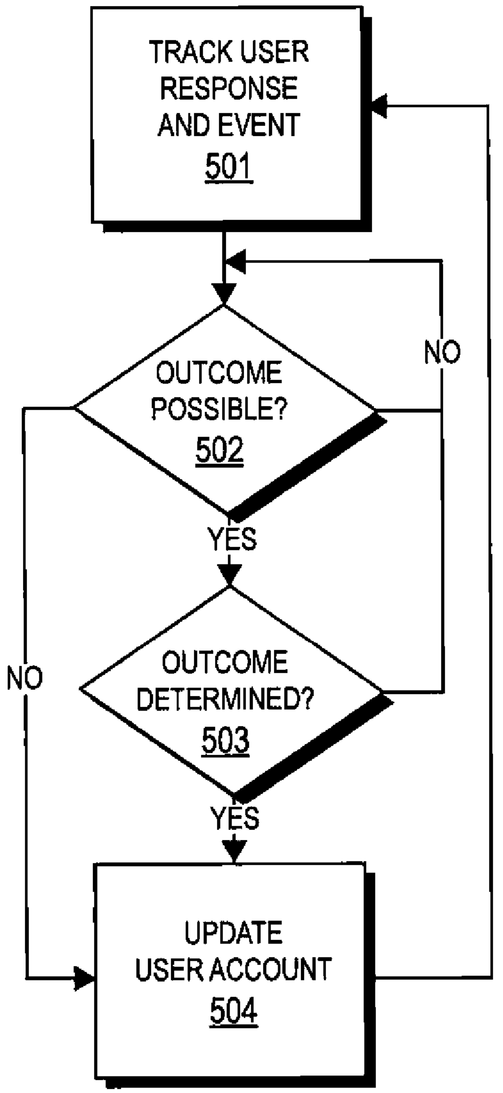
FIG. 5 is a flow diagram illustrating account tracking during event mode.

FIG. 5 is a flow diagram illustrating the operation of the system for each outcome that the user has predicted during event mode. The system tracks the user responses and the event at step 501. At decision block 502, the system determines if an outcome being tracked is still possible. If it is not possible, then the user's account is updated appropriately (positively if the user said the outcome wouldn't occur, and negatively if the user said the outcome would occur and it didn't).

If the outcome is still possible at decision block 502, the system proceeds to decision block 503 to determine if the outcome has in fact been determined. If so, the system updates the user account appropriately at step 504. If not, the system returns to step 502.

After the user account has been updated, the system returns to step 501 to track the event and user responses.

Standard Event Mode/Express Event Mode

In one embodiment of the system during event mode, there are two variations, namely standard event mode and express event mode. In standard event mode, the user predicts outcomes (and/or receives questions from the system) based on event situations, which may change rapidly and fluidly over time. For some users, the need to react quickly during the event itself can impact the viewing of the event, with the user preferring to be presented with fewer and less time sensitive options for predictions or questions during the event. For those users, the system provides express event mode.

In express event mode, the system presents a scaled down version of the system that the user can select when they feel they don't have enough time to make their selections between plays based on activity on the field, or for other preference reasons. The express event mode may present questions and/or limit the number of outcomes to predict so that the system is less time sensitive. For example, the system may ask for the result of an outcome that will occur at certain known breaks in the event, such as the end of innings or time periods of the event.

Figure 6:
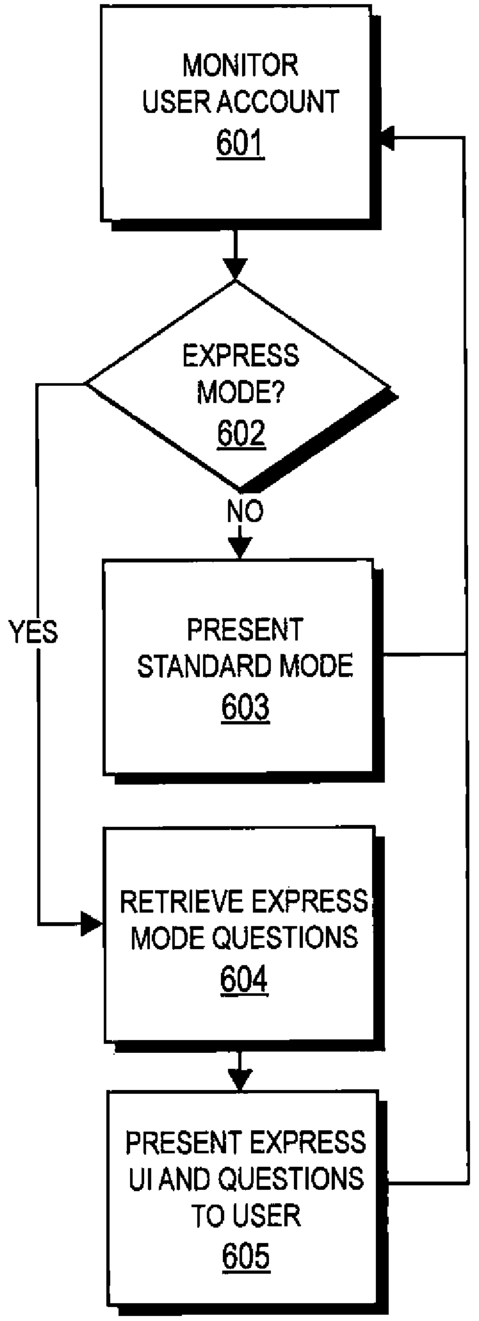
FIG. 6 is a flow diagram illustrating the tracking of event and express mode in an embodiment of the system.

FIG. 6 is a flow diagram illustrating the operation of the system during express event mode. At step 601 the system monitors the user account. At step 602 the system determines if the user has selected express mode. If not, the system presents standard event mode to the user at step 603 and returns to step 601 to monitor.

If the user has elected express mode at step 602, the system proceeds to step 604 and retrieves the current express mode questions. At step 605 the system sends the questions as well as a command to change the user interface of the user to express event mode. The system then returns to step 601.

Account Management

Participation in the system will be subscription based with members in one embodiment to be charged, for example, a fee per sport for each calendar year in which they sign up for the service (e.g. US$9.99). In one embodiment, there may also be a fee to participate and play in a particular event. Discounts can be available for multiple sports, and the maximum annual subscription for all sports may be, for example, $100. In addition, participants may be able to re-buy the potential to earn points at events while the events are going on. Through micro-transaction purchases, players will be able to buy Points which are used to back their predictions. Points are ammunition to help players. Players should always feel that the ability to re-buy more Points, which means you are "never out of it" during live competition. Criteria will be set around re-buys to prevent players from being able to buy their way to victory. Participants will have access to any game or event which is covered by the system network. Additional sources of revenues will include advertising on the site, the sale of products and services, and the system may receive referral fees for providing services to its clients.

In one embodiment, the system can provide additional benefits to a user who is attending the event live, at a designated location such as a sports bar, or using a particular device to participate in the game, as compared to a user who is watching the event remotely (e.g. on TV) but is participating in the system. This may act as an incentive to boost attendance. The event location owner and/or the event performer or team may partner in the system to provide benefits to users who both attend the event and participate in the system.

Such benefits can include the possibility of seat upgrades, food or drink discounts, or retail discounts as a special reward based on some performance criteria while using the system, as well as an award of points in the system. The seat upgrade may be in the current event or for some future event. In addition, the system may provide a premium to the at-event user such as higher rewards for correct predictions of outcomes, and/or cheaper cost to participate in the system.

Figure 7:
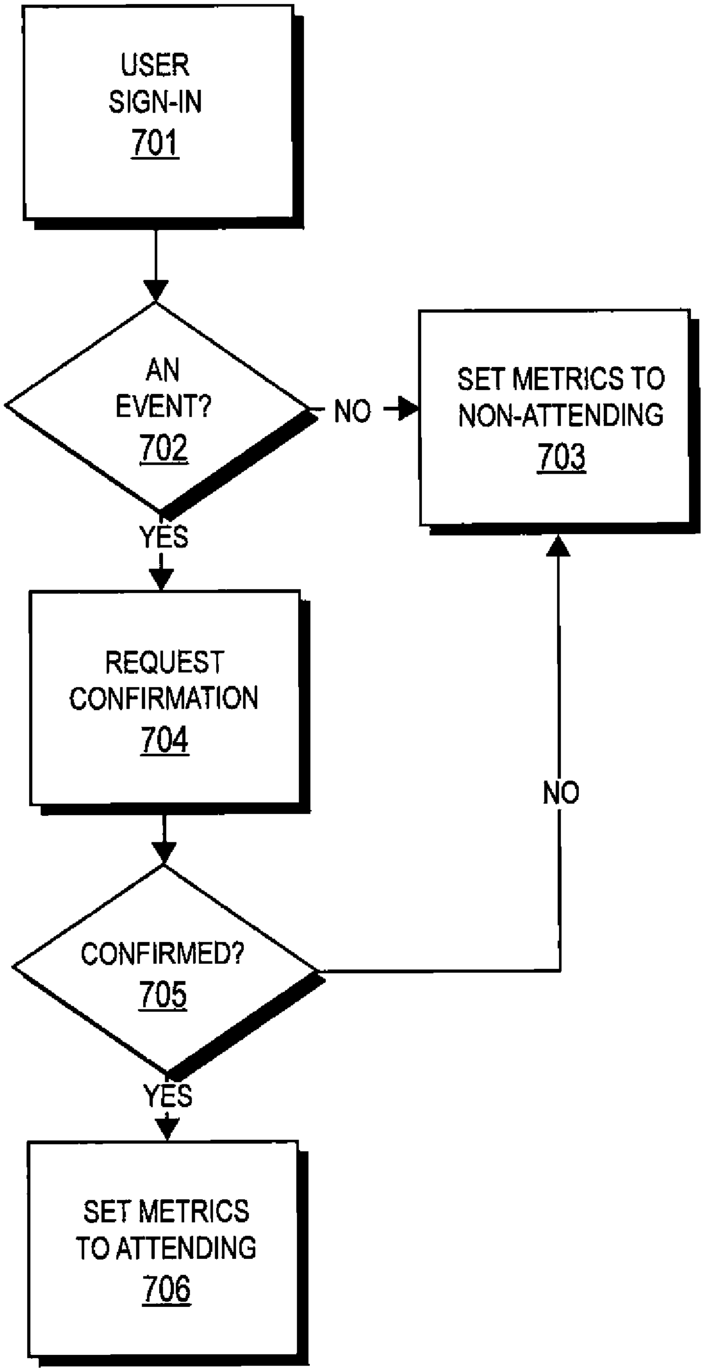
FIG. 7 is a flow diagram illustrating the operation of the system in attending and non-attending status.

FIG. 7 is a flow diagram illustrating account management in one embodiment of the system. At step 701 a user logs into the system. At step 702 the system queries if the user is at the event or designated location. If no, the system proceeds to step 703 and sets all metrics for the event to non-attending status.

If the user responds yes at step 702, the system proceeds to step 704 and requests confirmation from the user that the user is actually at the event. This can be accomplished in a number of ways. For example, the system may have access to the season ticket holders of the event and may provide attending status to all those who have purchased a ticket. In another embodiment, the system may have the user enable tracking on a smart-phone to determine if the user is at the geographic location of the event. In other instances, the user may scan their ticket or receipt of some form into their smart-phone or other device as proof of attendance at the event or designated location. In another embodiment, the system may flash a confirmation number at some location at the event and have the user enter the displayed confirmation number.

If the confirmation is confirmed at step 705, the system proceeds to step 706 and sets the users metrics to attending status. If the confirmation fails at step 705, the system returns to step 703 and sets the user's metrics to non-attending status.

Members at the event will have a much greater incentive to stay, as there will always be "Surprise" questions near the end and even, typical questions all the way to the final inning or end of the event. The teams will appreciate fans staying longer, as the longer they stay, the more money they spend. Members watching will also stay involved longer and be exposed to more advertising by team sponsors.

User Interface

Figure 8:
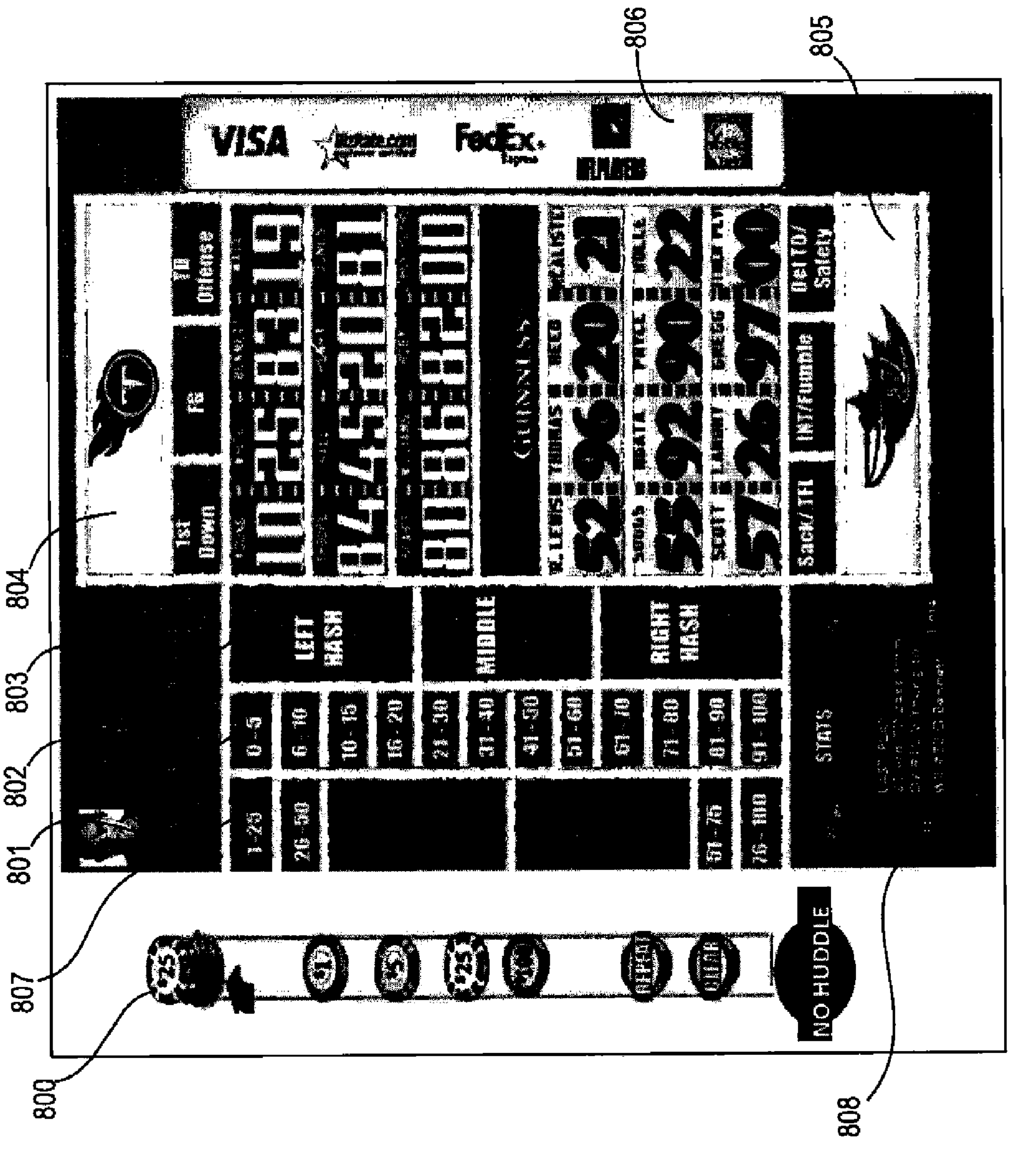
FIG. 8 is an example of a user interface in an embodiment of the system.

FIG. 8 is an example of a user interface in one embodiment of the system. The example shown is for a football event (e.g. Titans vs. Ravens) but it should be understood that it is for exemplary purposes only, and other interfaces may be employed for this and other sports without departing from the scope and spirit of the system.

In FIG. 8, the display is divided into columnar regions from left to right with each column further subdivided into some number of rows or sub-regions. In the example shown, the left hand column 800 shows the total number of points available to the user in the form of chips of different denominations. The user can click on a chip or combination of chips to enter the number of points that the user is willing to risk for a particular outcome. In another embodiment, the user can simply directly enter an amount of points to be at risk for a particular outcome prediction. A repeat button 801 allows the user to repeat a prior point amount and/or outcome prediction without manually re-entering the prediction criteria.

Column 802 in this embodiment groups outcome predictions having some odds of occurring. The odds may be changed based on historical statistical data, current statistical activity in the event itself, through impact of pari-mutuel effects, or by some other means. The odds may change during the event itself as desired.

Region 802 divides the yardage into different ranges and allows the user to predict if the next play will result in yardage within the specified yardage range. When the user mouses over the various yardage ranges, the odds for predicting that outcome are displayed. Region 803 allows the user to predict where on the field itself the next play will end up. Regions 804 and 805 allow the user to predict possible significant events by the offense and defense such as touchdowns, field goals, sacks, interception/fumbles, and the like.

The regions with number represent the jersey number and name of participants in the event. The system permits the user to predict outcomes related to one or more particular players or performers as desired. In one embodiment, the user can select individual players, rows or columns of players, pairs or quadrants of players, and the like.

Region 806 is an area that may include advertising or other informational material. Region 806 provides results of situations and outcomes of the event, and region 807 provides account and user data for the user, including point status.

Figure 9:
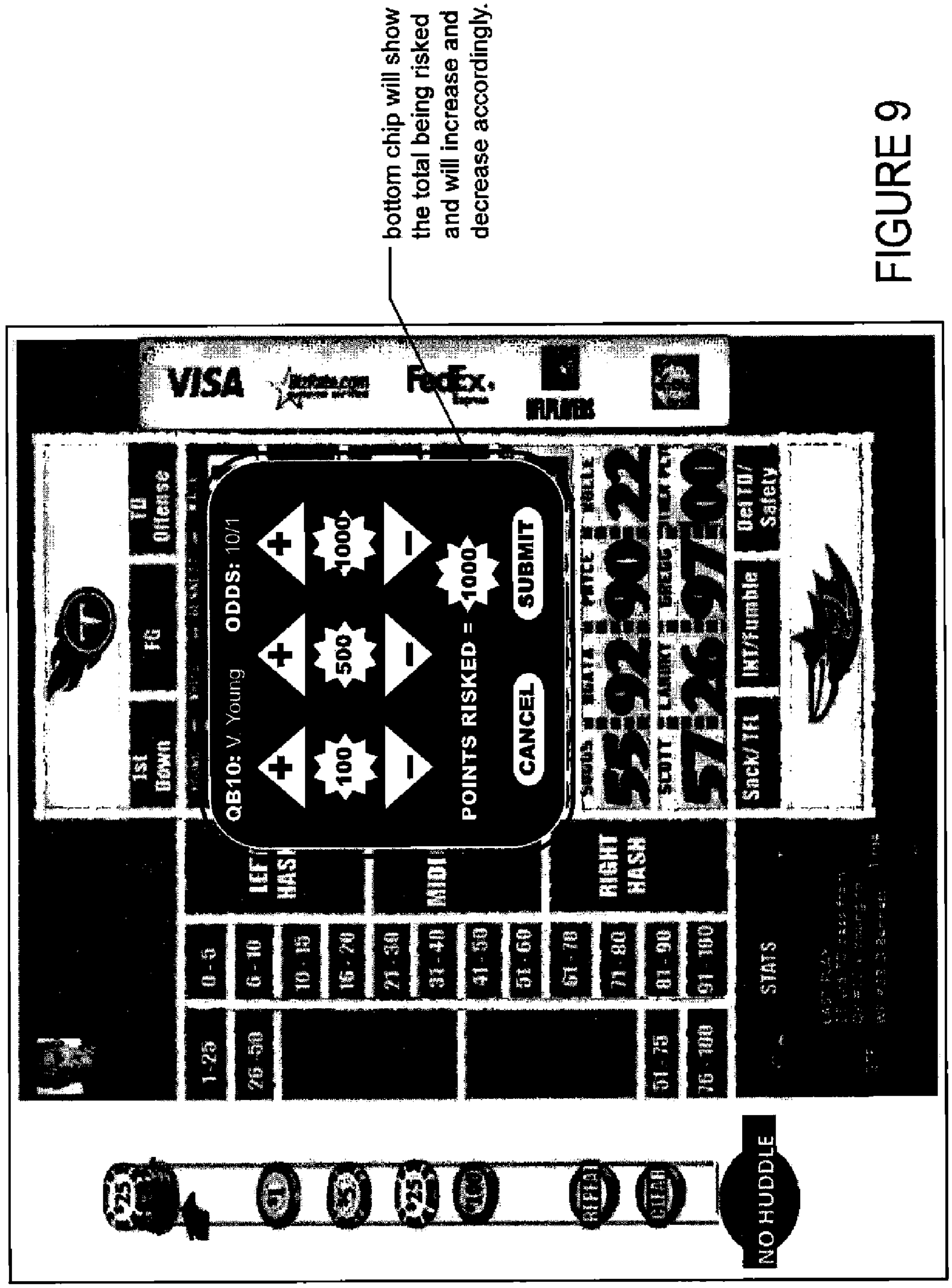
FIG. 9 is an example of a pop-up interface in an embodiment of the system.

When the user selects a particular area of the board to make an outcome prediction, the system in one embodiment appears as in FIG. 9. A pop-up window will appear with icons allowing the user to determine a risk amount, showing the odds, and allowing the user to submit or cancel. As noted above, the user must get the prediction in before the cut-off time (usually before the beginning of the next play).

Once the user has made a selection, the interface will show an icon, such as a chip, on top of the interface region for which a prediction has been made. If there are multiple predictions, multiple chips will be shown with the amount risked indicated in each chip icon.

When the user selects an express event mode (e.g. "No Huddle"), the system interface will be changed to a simplified presentation and different prediction options will appear to the user. The express event mode can be toggled on and off as desired by the user.

System

Figure 11:
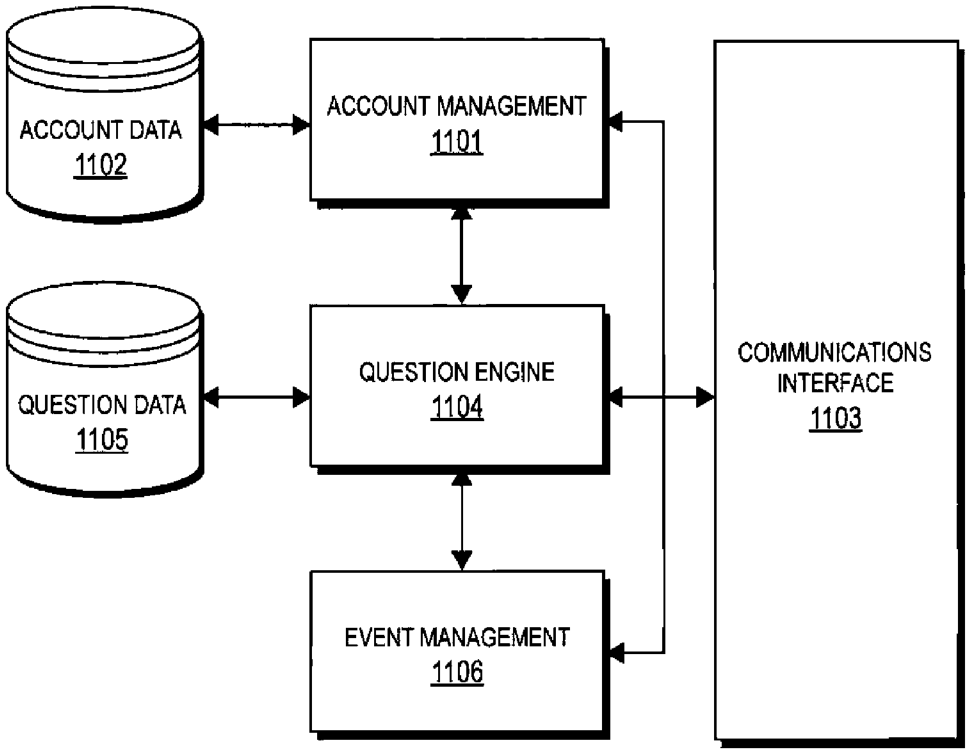
FIG. 11 is a block diagram of an embodiment of the system.

FIG. 11 is an example of an embodiment of the system. The system includes account management engine 1101 coupled to account storage 1102. The system communicates via communications interface 1103. Question generation engine 1104 is coupled to question storage 1105 and is used to present questions to the user based on event status and situations.

Event management engine 1106 is coupled to data feeds through communications interface 1103 and receives event update information via a data feed and/or manual input from an operator. The event engine 1106 communicates with the question engine 1104 and account engine 1101 to ensure that the user display is updated properly.

Embodiment of Computer Execution Environment (Hardware)

Figure 10:
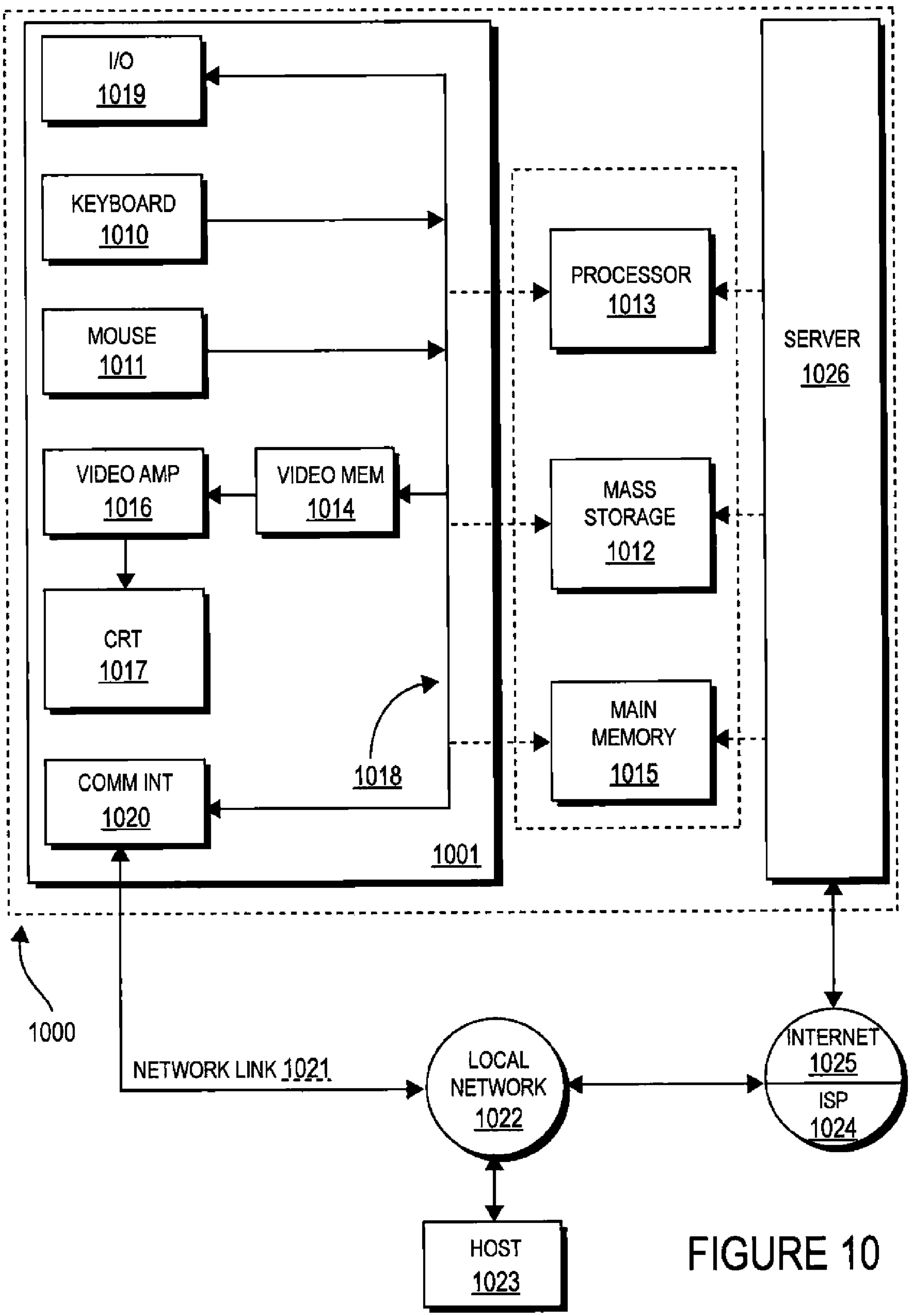
FIG. 10 is an example computer embodiment for implementing the system.

An embodiment of the system can be implemented as computer software in the form of computer readable program code executed in a general purpose computing environment such as environment 1000 illustrated in FIG. 10, or in the form of bytecode class files executable within a Java™. run time environment running in such an environment, or in the form of bytecodes running on a processor (or devices enabled to process bytecodes) existing in a distributed environment (e.g., one or more processors on a network). A keyboard 1010 and mouse 1011 are coupled to a system bus 1018. The keyboard and mouse are for introducing user input to the computer system and communicating that user input to central processing unit (CPU 1013. Other suitable input devices may be used in addition to, or in place of, the mouse 1011, and keyboard 1010. I/O (input/output) unit 1019 coupled to bi-directional system bus 1018 represents such I/O elements as a printer, A/V (audio/video) I/O, etc.

Computer 1001 may include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals which carry digital data streams representing various types of information.

Network link 1021 typically provides data communication through one or more networks to other data devices. For example, network link 1021 may provide a connection through local network 1022 to local server computer 1023 or to data equipment operated by ISP 1024. ISP 1024 in turn provides data communication services through the world wide packet data communication network now commonly referred to as the "Internet" 10210 Local network 1022 and Internet 10210 both use electrical, electromagnetic or optical signals which carry digital data streams. The signals through the various networks and the signals on network link 1021 and through communication interface 1020, which carry the digital data to and from computer 1000, are exemplary forms of carrier waves transporting the information.

Processor 1013 may reside wholly on client computer 1001 or wholly on server 1026 or processor 1013 may have its computational power distributed between computer 1001 and server 1026. Server 1026 symbolically is represented in FIG. 10 as one unit, but server 1026 can also be distributed between multiple "tiers". In one embodiment, server 1026 comprises a middle and back tier where application logic executes in the middle tier and persistent data is obtained in the back tier. In the case where processor 1013 resides wholly on server 1026, the results of the computations performed by processor 1013 are transmitted to computer 1001 via Internet 10210, Internet Service Provider (ISP) 1024, local network 1022 and communication interface 1020. In this way, computer 1001 is able to display the results of the computation to a user in the form of output.

Computer 1001 includes a video memory 1014, main memory 1015 and mass storage 1012, all coupled to bi-directional system bus 1018 along with keyboard 1010, mouse 1011 and processor 1013.

As with processor 1013, in various computing environments, main memory 1015 and mass storage 1012, can reside wholly on server 1026 or computer 1001, or they may be distributed between the two. Examples of systems where processor 1013, main memory 1015, and mass storage 1012 are distributed between computer 1001 and server 1026 include thin-client computing architectures and other personal digital assistants, Internet ready cellular phones and other Internet computing devices, and in platform independent computing environments, The mass storage 1012 may include both fixed and removable media, such as magnetic, optical or magnetic optical storage systems or any other available mass storage technology. The mass storage may be implemented as a RAID array or any other suitable storage means. Bus 1018 may contain, for example, thirty-two address lines for addressing video memory 1014 or main memory 1015. The system bus 1018 also includes, for example, a 32-bit data bus for transferring data between and among the components, such as processor 1013, main memory 1015, video memory 1014 and mass storage 1012. Alternatively, multiplex data/address lines may be used instead of separate data and address lines.

In one embodiment of the invention, the processor 1013 is a microprocessor such as manufactured by Intel, AMD, Sun, etc. However, any other suitable microprocessor or microcomputer may be utilized, including a cloud computing solution. Main memory 1015 is comprised of dynamic random access memory (DRAM). Video memory 1014 is a dual-ported video random access memory. One port of the video memory 1014 is coupled to video amplifier 1019. The video amplifier 1019 is used to drive the cathode ray tube (CRT) raster monitor 1017. Video amplifier 1019 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1001 can send messages and receive data, including program code, through the network(s), network link 1021, and communication interface 1020. In the Internet example, remote server computer 1026 might transmit a requested code for an application program through Internet 10210, ISP 1024, local network 1022 and communication interface 1020. The received code maybe executed by processor 1013 as it is received, and/or stored in mass storage 1012, or other non-volatile storage for later execution. The storage may be local or cloud storage. In this manner, computer 1000 may obtain application code in the form of a carrier wave. Alternatively, remote server computer 1026 may execute applications using processor 1013, and utilize mass storage 1012, and/or video memory 1015. The results of the execution at server 1026 are then transmitted through Internet 10210, ISP 1024, local network 1022 and communication interface 1020. In this example, computer 1001 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. In other embodiments, the system may be implemented on any suitable computing environment including personal computing devices, smart-phones, pad computers, and the like. An embodiment of the invention may be implemented in any type of computer system or programming or processing environment.

Thus a method and apparatus for interactive entertainment has been described.

What is claimed is:

1. A method for providing interactive entertainment in a processing system comprising:

presenting a plurality of outcome possibilities to a user wherein the outcome possibilities are based on an event;

presenting questions to the user based on situations created during the event;

retrieving predictions of the outcomes and answers to the questions made by the user, wherein the predictions of the outcomes made by the user are selected from the plurality of outcome possibilities;

comparing the outcome predictions and the answers to the questions to the actual outcomes; and awarding points to the user based on accuracy of the outcome predictions and the answers to the questions.

2. The method of claim 1 further comprising updating a user account with the awarded points.

3. The method of claim 1 comprising a first mode of presenting a first group of outcome possibilities to the user prior to the start time of the event.

4. The method of claim 3 comprising a second mode of presenting a second group of outcome possibilities during the event.

5. The method of claim 4 comprising a third mode of presenting a third group of outcome possibilities during the event, wherein the third group is a subset of the second group.

6. The method of claim 1 further including providing system benefits to a user who attends the event.

7. The method of claim 1 further including providing system benefits to a user who attends a designated location during the event.

8. The method of claim 1 further including assigning odds to the outcome possibilities.

9. The method of claim 8 further including dynamically modifying the odds of the outcome possibilities during the event.

10. The method of claim 9 wherein the odds are determined in a pari-mutuel system.

* * * * *